… … US005587701A

United States Patent [19]
Hess

[11] Patent Number: 5,587,701
[45] Date of Patent: Dec. 24, 1996

[54] PORTABLE ALARM SYSTEM

[76] Inventor: Brian K. Hess, 403 Aylesbury Dr. South, Westerville, Ohio 43081

[21] Appl. No.: 303,950

[22] Filed: Sep. 9, 1994

[51] Int. Cl.$^6$ ................................................. G08B 13/00
[52] U.S. Cl. ........................... 340/541; 340/538; 340/539; 340/545; 340/693; 379/44
[58] Field of Search ..................................... 340/539, 541, 340/545, 546, 691, 326, 331, 538, 693; 379/40, 44, 51, 56, 57, 106; 348/152–155

[56] References Cited

U.S. PATENT DOCUMENTS

| | | | |
|---|---|---|---|
| 4,264,899 | 4/1981 | Menzies et al. | 340/546 |
| 4,667,188 | 5/1987 | Schwartz | 340/689 |
| 4,904,983 | 2/1990 | Mitchell | 340/426 |
| 4,908,604 | 3/1990 | Jacob | 340/539 |
| 4,910,493 | 3/1990 | Chambers et al. | 340/426 |
| 4,951,029 | 8/1990 | Severson | 340/539 X |
| 4,964,156 | 10/1990 | Blair | 379/189 |
| 5,081,667 | 1/1992 | Drori et al. | 379/59 |
| 5,117,223 | 5/1992 | Tanner | 340/541 X |
| 5,144,661 | 9/1992 | Shamosh et al. | 380/9 |
| 5,164,705 | 11/1992 | Dunagan et al. | 340/547 |
| 5,225,713 | 7/1993 | Henneberry et al. | 307/102 |
| 5,255,306 | 10/1993 | Melton et al. | 379/38 |
| 5,289,534 | 2/1994 | Lester et al. | 340/545 X |
| 5,311,570 | 5/1994 | Grimes et al. | 379/57 |
| 5,319,698 | 6/1994 | Glidewell et al. | 340/541 X |

*Primary Examiner*—Thomas Mullen
*Attorney, Agent, or Firm*—Standley & Gilcrest

[57] ABSTRACT

A portable alarm system is disclosed in which the alarm functions are contained within a portable enclosure, communication is maintained between the enclosure and wireless security contacts placed at points of entry, and the alarm is capable of initiating a telephone call to a security monitor station either by conventional hard wired telephone lines within a building, or by cellular transmission, or via 800 MHz trunking.

4 Claims, 6 Drawing Sheets

PORTABLE ALARM SYSTEM

BACKGROUND AND SUMMARY OF THE INVENTION

The present invention relates generally to alarm systems, and more particularly, to a portable alarm system for use in a residence, boat, cabin, office, and practically any other structure.

Alarm systems of various types have been in existence for many years. Alarm systems are now available for automobiles as well as for building structures, such as homes, businesses, etc. In home alarm systems known today, the alarm systems are usually hard wired throughout a home and the wiring usually terminates at a control panel located somewhere within the home. One of the chief drawbacks of such a system is the fact that it is permanently installed in the home and offers nothing to the original purchaser of the alarm system when he or she moves from the home. Furthermore, the installation of such an alarm system is labor intensive, and therefore, requires significant expense to pay for the installation. The present invention does everything a home alarm system does and more. The present invention is portable, externally wireless, and is capable of placing a call without need of the hard wired telephone system in place at a home or business.

The present invention comprises a 7portable alarm apparatus that incorporates wireless technology along with cellular telephone service technology for example, to provide a unique and effective deterrent to illegal entry. The present invention is capable of sounding a high-decibel alarm, and contacting a security monitor station via cellular or other wireless telephonic transmission technology. The present invention is equipped to monitor door and window entries and can sense motion within a room with an optional motion detector. The present invention is the only alarm system currently known which is (a) portable, (b) offers wireless connections to doors and windows, and (c) optionally incorporates cellular or other wireless telephonic technology.

Home alarm systems are frequently connected to the home's telephone wiring to automatically place a call to a monitor station at some distance away from the home to warn those at the monitor station that a possible illegal entry has occurred at the home. This, in theory, enables those at the monitor station to either send a security officer to the home or to place a call to the police to have a police officer inspect the home where the alarm was activated. A drawback of this type of system is that sophisticated burglars are knowledgeable of such systems and will cut the telephone wires prior to entry into the home, thereby rendering the security monitor station useless because when the illegal entry occurs, the system will not function to place the automatic call to the security monitor station.

The present day security alarm system market does not offer alternatives for the millions of citizens that live in apartments (where they are not likely to spend significant amounts of money to install a permanent hard wired alarm system when they may not be living in the apartment for more than a relatively short amount of time), a hotel room, a leased office space, short term warehousing, and a multitude of other environments in which a person would not intend to stay for a relatively long period of time and thus would not wish to invest significant expense in a permanent alarm system for that environment. It is exactly these environments where crime is often the highest. The lack of alarm choices available to this market, usually tend to lack sophistication and reliability to effectively deter an illegal entry. A need exists for an alarm system that is portable, that offers the same degree or better of protection as a permanent, hard wired alarm system, which is relatively inexpensive, and which does not have to rely on a building's installed telephone lines. Other features of the invention will become apparent from the following description.

DETAILED DESCRIPTION OF PREFERRED EMBODIMENT(S)

Figure 1:
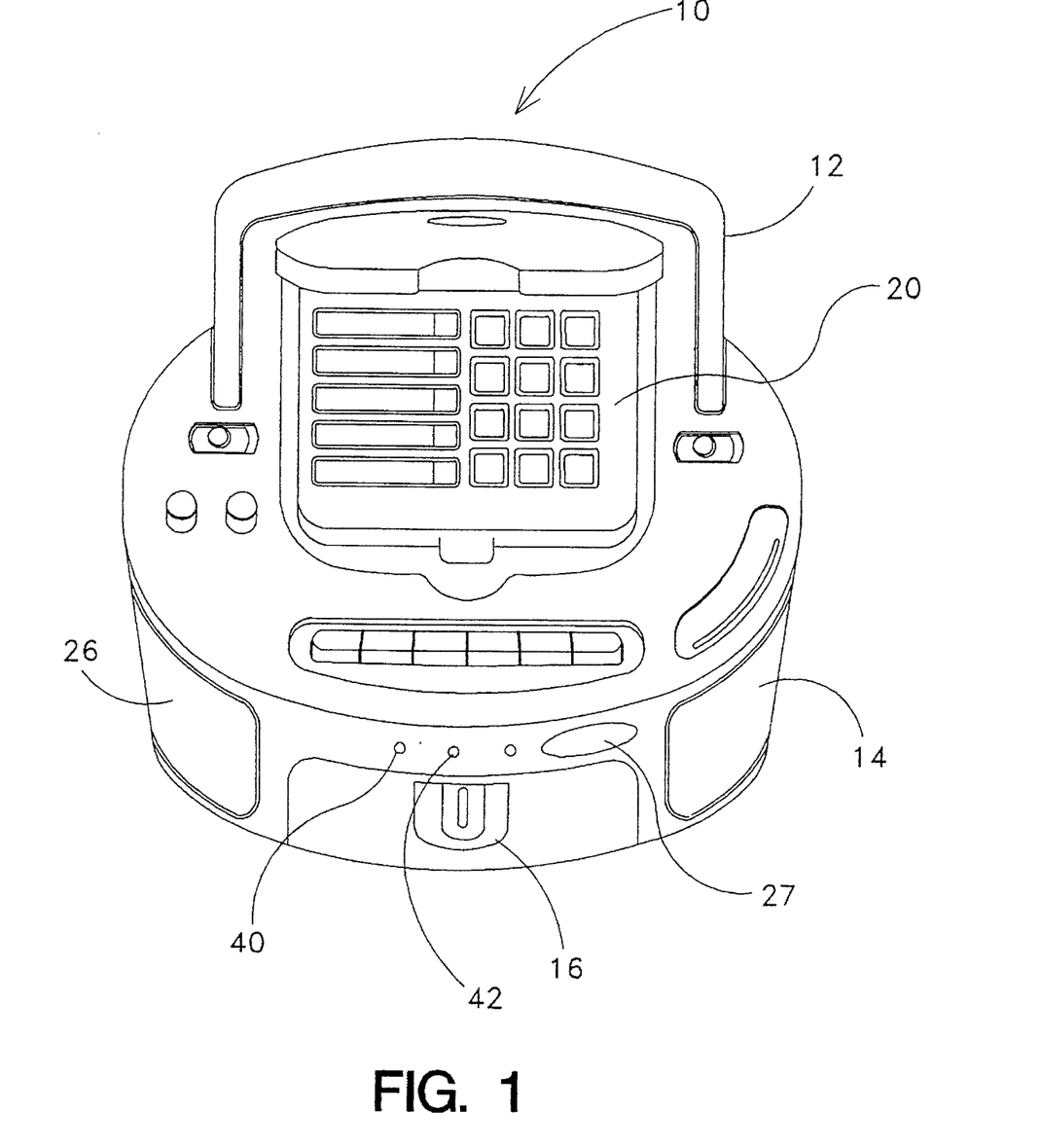
FIG. 1 is a perspective view of one embodiment of the present invention.

Referring now to the drawings, in FIG. 1 one embodiment of the present invention is shown within a portable enclosure 10. In this embodiment the enclosure is preferably of a size and shape that resembles a stereo or compact disk player. A handle 12 may be attached to the enclosure making it readily transportable. The appearance of being a compact disk player or cassette player is an added advantage of the present invention in that an illegal intruder peering through a window of a residence may mistake the alarm apparatus for being a compact disk player or other stereo equipment and, therefore, would tend not to suspect that the device was an alarm system. Since illegal intruders frequently attempt to destroy an alarm system so that it cannot be used against them, a disguised alarm may go unnoticed, at least initially.

The enclosure can be made of a variety of materials. A preferred material for the enclosure is a shatter-proof polyurethane that would resist attempts to destroy it by throwing it, kicking it, or jumping on it. An illegal intruder may attempt to disable the apparatus of the present invention when the audio alarm sounds. With the enclosure made of a material that resists impacts, the alarm may continue to sound and eventually cause the illegal intruder to abandon efforts to disable it. With the components securely mounted within the enclosure an illegal intruder would have difficulty breaking through the enclosure to disarm the alarm. Components within the enclosure may be mounted in a suspended and/or cushioned manner to enable sustaining of shocks and impacts to the enclosure.

Figure 2:
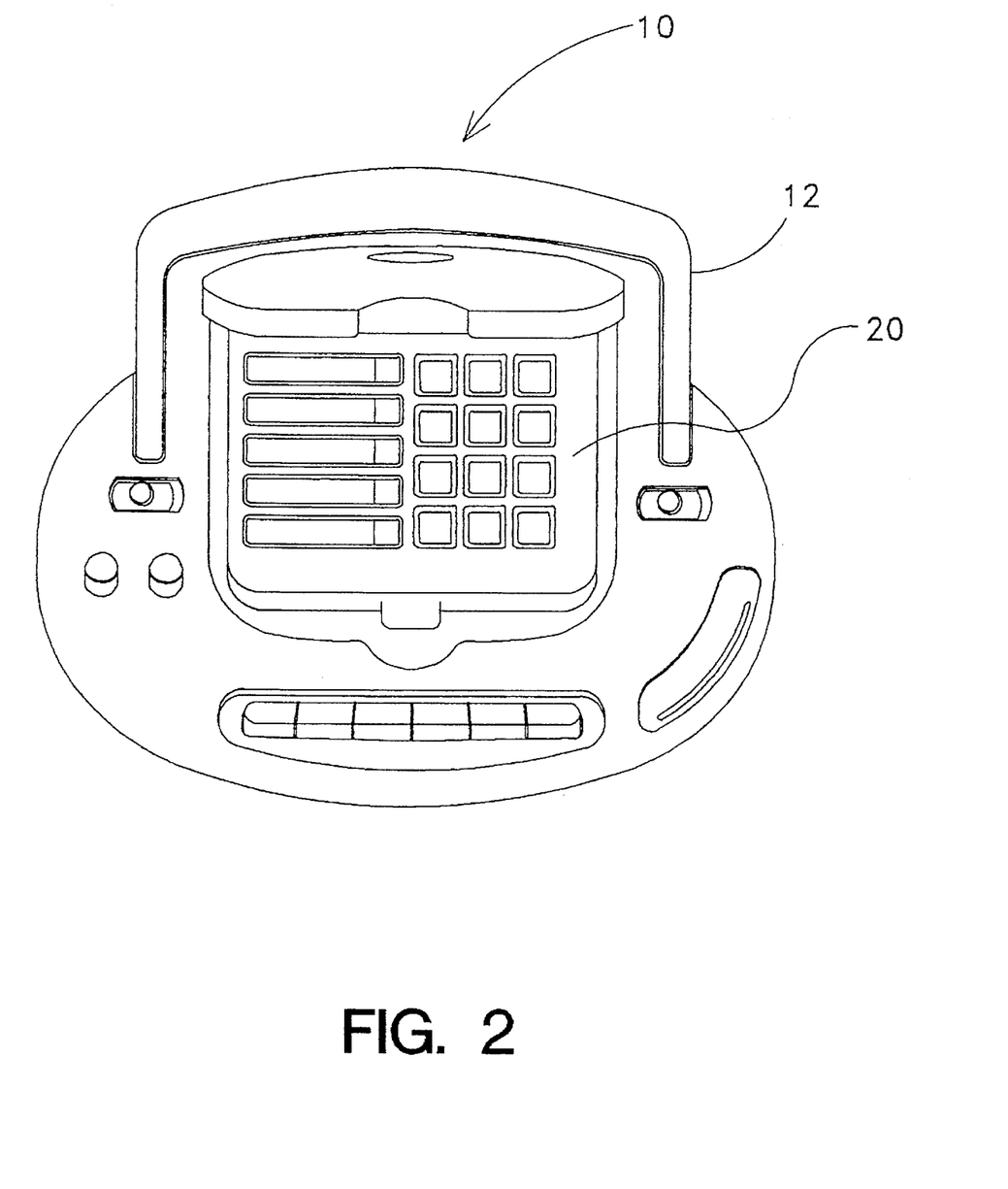
FIG. 2 is a view from above looking down on the apparatus of FIG. 1.

Referring now to FIGS. 1 and 2, the components of a preferred embodiment of the present invention will now be described. The apparatus of the present invention preferably is equipped with an audio siren 14 that is flush-mounted to a surface of the enclosure to appear as though it is a speaker on a stereo or radio device. Audio alarm sirens are available from a number of sources, such as Realistic. In a preferred embodiment of the present invention the siren is rated at 130 db. Also, preferably mounted within the enclosure is a flush-mounted motion detector 16 which may be positioned in an area of the apparatus that would normally appear to be a radio frequency selection display. Motion detectors may be purchased from a variety of manufacturers, such as Napco. A preferred range for the motion detector would be sufficient to adequately cover the area of a large room, preferably out to a 70 feet range from the location of the motion detector. An antenna 17 is preferably attached to the present invention to assist in a cellular telephone connection which will be described in greater detail hereinafter. The device may also be preferably equipped with a battery backup unit 18 in the event electricity is not readily available at a location in which the device is to be used. An electrical connection 19 may be provided for those instances when the device is connected to a standard home or office electrical wall outlet.

An interface panel, such as a key pad 20, may be mounted in a position within the enclosure that may normally appear to be a stereo control panel. The interface controls would enable the present invention to function much in the same way as a hard-wired permanent home alarm system control panel. The interface panel of the present invention would preferably enable the audio siren to be deactivated, to program the telephone number of a security monitor station into the alarm system, and to enter a user code that would enable the owner of the device to deactivate the device during a predetermined time immediately upon entry into the alarm owner's residence. The interface panel may also be used to send a silent distress signal by pressing certain code numbers on the panel. The panel may also include panic buttons that sound an alarm immediately upon being depressed.

Figure 3:
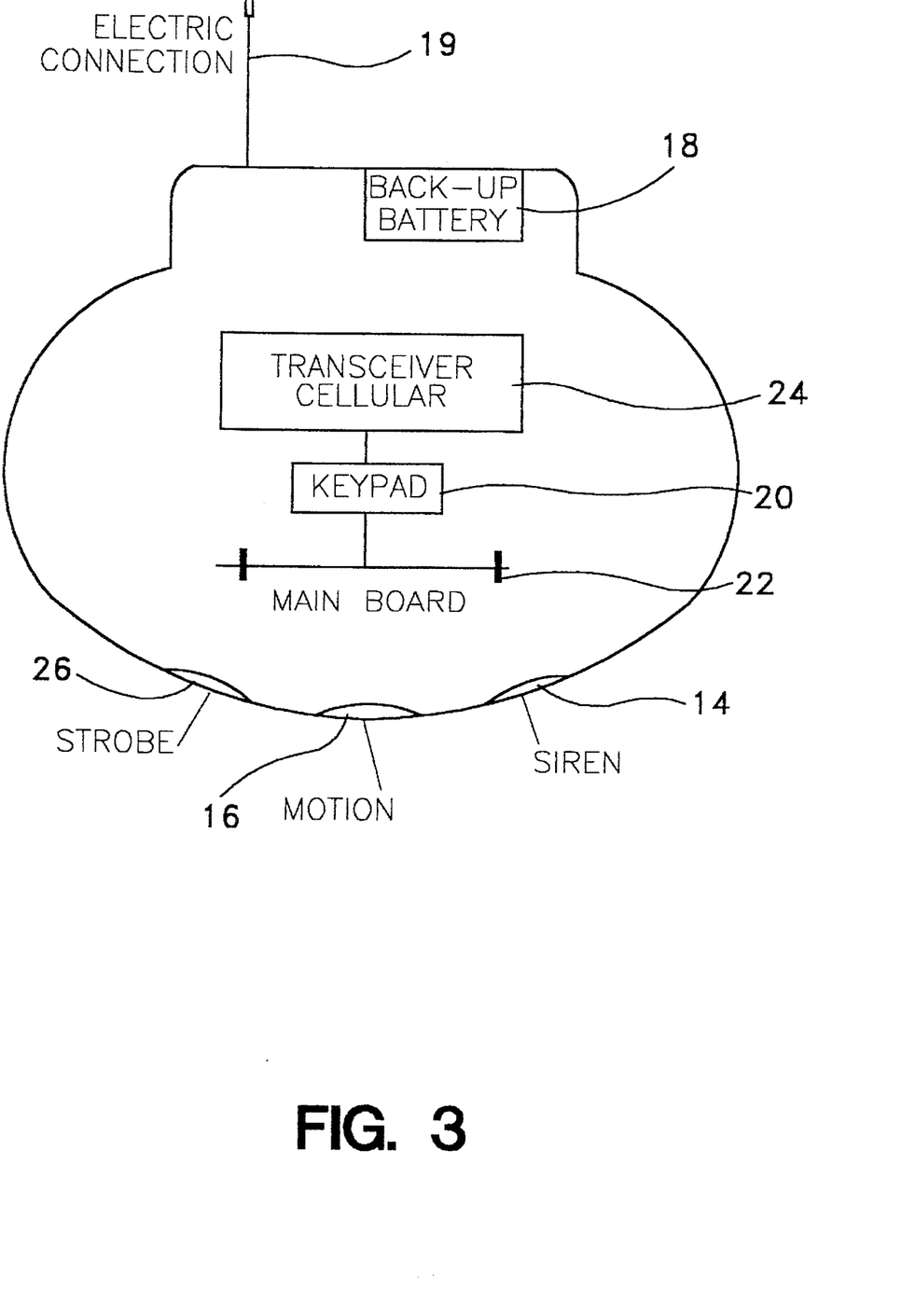
FIG. 3 is a diagrammatical view of the contents of the apparatus shown in FIG. 1.

Referring now to FIG. 3, the enclosure further contains a monitoring microprocessor board 22 which may be obtained from several manufacturers, such as Napco. Preferably connected to the monitoring microprocessor board is a cellular transceiver 24. Cellular transceivers may be purchased from a number of manufacturers, such as Motorola. The monitoring microprocessor board and cellular transceiver are electrically connected to the control interface panel. Also connected to the monitoring microprocessor board is a receiver 25 for receiving wireless conveyed signals from security contacts mounted at doors and windows within the building being monitored. Wireless transceivers are available from several manufacturers, such as Linear. The enclosure of the present invention may also include a flush-mounted strobe light 26 which would preferably be activated along with the audio alarm siren. Small video cameras 27 are now commercially available that may be mounted within the enclosure of the present invention. These cameras are capable of sending a series of pictures of the room where the present invention is placed to a security monitoring office, via the telephone connection.

Figure 4:
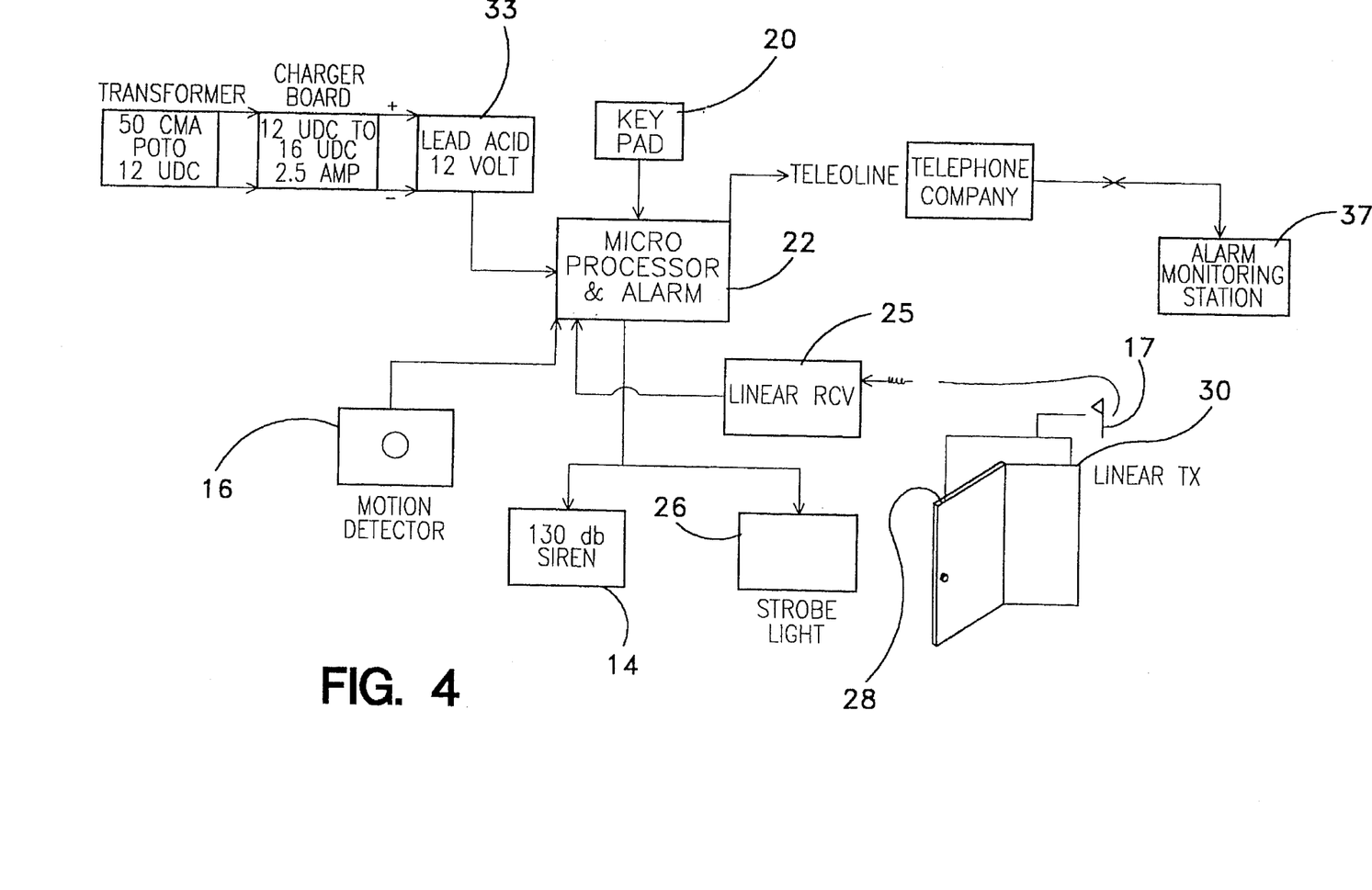
FIG. 4 is a block diagram of one preferred embodiment of the alarm system of the present invention.

Referring now to FIG. 4, an implementation of the present invention is shown in which the alarm enclosure is equipped with a standard telephone wall connect wire that may be connected to standard telephone wall jacks which are common in buildings today. In this embodiment, wireless security contact switches 28, 30 are placed on doors and windows of a residence. If a door or window is opened while the alarm is set, the alarm will be activated. The breaking of the switch connection at the security contacts, at the point of entry, causes a signal to be received at the wireless receiver mounted within the enclosure of the alarm device of the present invention. Once the signal has been received within the enclosure, it will cause the audio siren to sound and the strobe light to go on. Furthermore, the monitoring microprocessor board will cause a signal to be sent through the telephone lines placing a call to a security monitor station.

Figure 5:
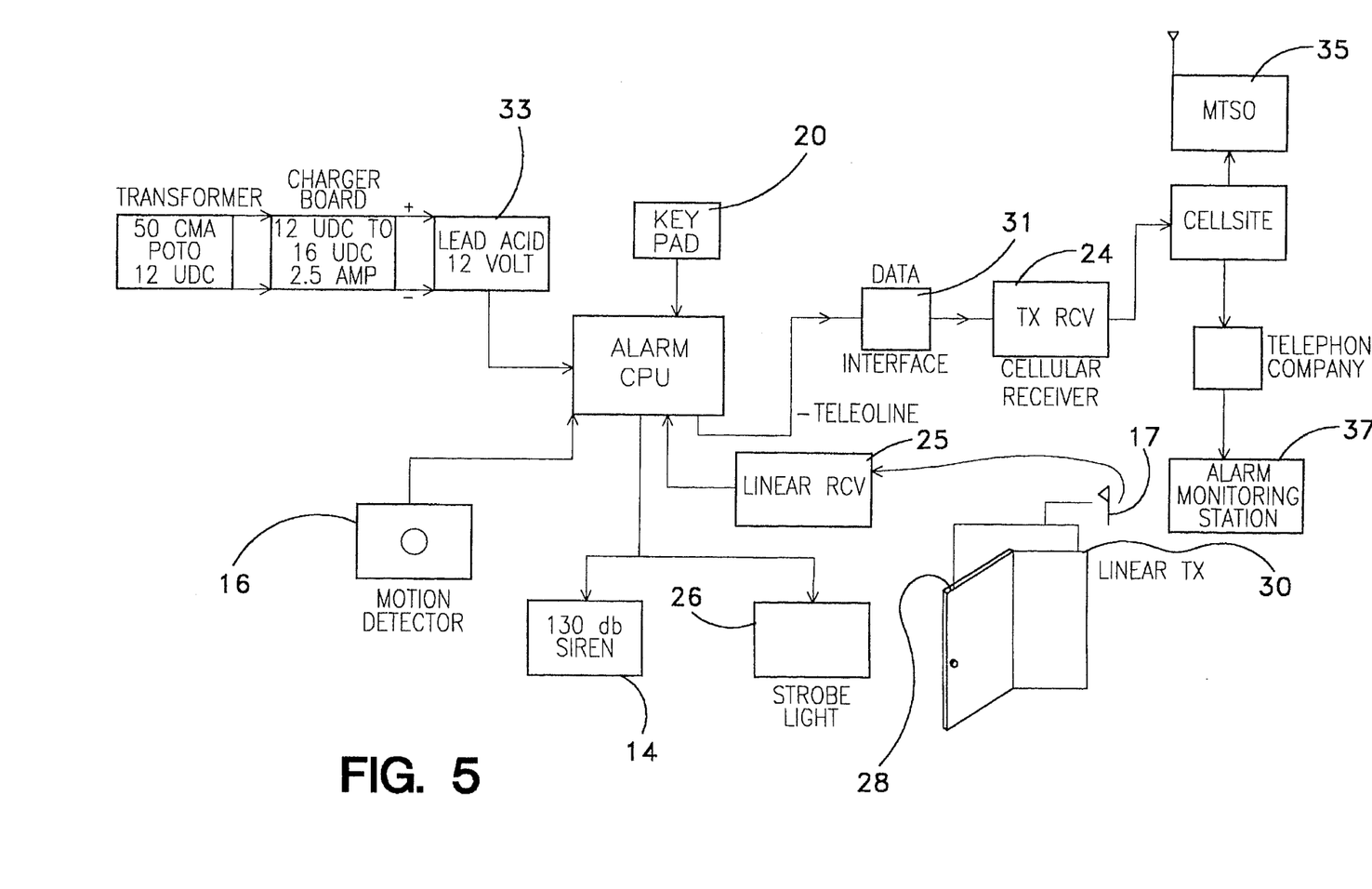
FIG. 5 is a block diagram of a second embodiment of the alarm system of the present invention.

Referring now to FIG. 5, another embodiment of the present invention is shown in which the telephone connection is not through a standard telephone line jack wall-mounted within a residence, but is made via a cellular transceiver using microwave technology. Other than the cellular telephone connection, the embodiment shown in FIG. 5 would function analogously to the embodiment shown in FIG. 4. Other call transmission means may be incorporated into the present invention. For example, 800 MHz trunking may be used instead of a cellular transceiver.

The audio alarm of the present invention is powered, preferably from a 120 volt AC connection reduced by a transformer to 12 volts DC. From the transformer a connection is preferably made to a lead acid battery to keep the battery charged in the event that electricity is cut to the device and the battery is needed to maintain all functions of the device.

The alarm of the present invention may be preset to allow a predetermined delay time in which to shut off the alarm once an entry has occurred. This predetermined delay time can be set by the owner of the device, but is preferably not more than 30 seconds.

The alarm may be programmed through the key pad to interact with different zones within a residence. For example, zone 1 may be the front door of a residence through which most people enter. Zones 2, 3 and 4 may be zones that are normally not entered, such as windows. The alarm may be preset to have a delay at zone 1, for example of 30 seconds, and no delay at zones 2, 3 and 4. With zones having no delay, if an entry is made, the alarm would immediately sound. The present invention may be programmed to inform a security monitor station of the zone entered by an intruder. If the alarm system of the present invention is not connected to a security monitor station, it may be programmed to automatically dial 911, for example.

When cellular technology is incorporated in the present invention, an interface unit 31 is built into the receiver of the cellular transceiver to formulate a tip and ring, which is commonly associated with a dial tone on standard telephone systems. The tip and ring is initiated through the cellular transceiver and a call goes out to a cell site. From the cell site a signal is sent to a mobile telephone subscriber's office (MTSO) 35. From the MTSO, the call is typically forwarded to the land line telephone company and from there to its final destination (i.e.—the security monitor station 31 or 911 office).

The enclosure of the present invention may be equipped with a first colored light 40 to indicate that the system is functioning properly and that all zones are in a secured position. Once the alarm is set to activate upon entry a second colored light 42 may be provided to indicate readiness.

Figure 6:
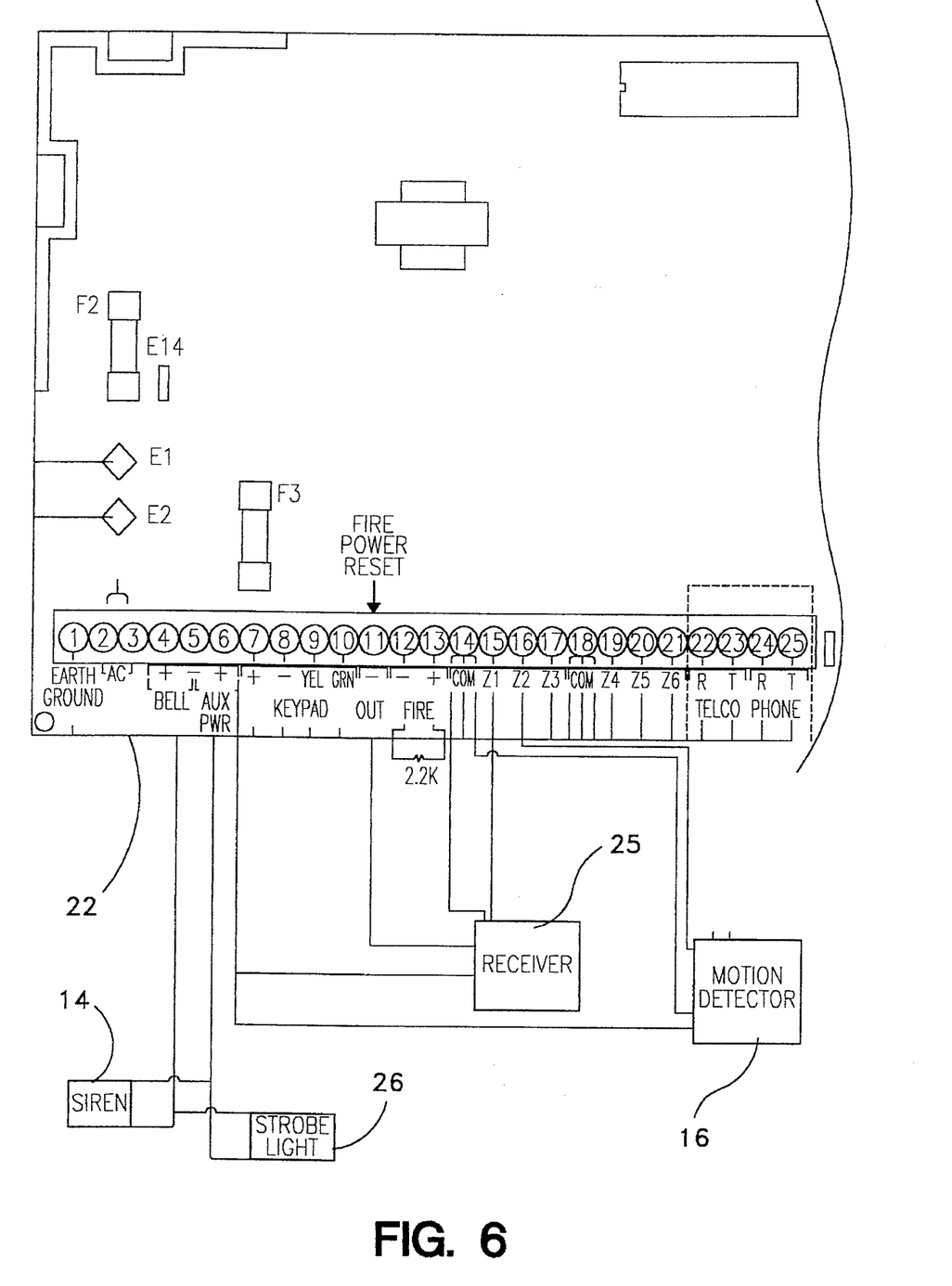
FIG. 6 is a partial diagrammatical view of a logic control board for use in one embodiment of the present invention.

In a preferred embodiment of the present invention a Napco model MA1000E unit having two main printed circuit boards, a Napco RP1054E key pad, one power supply, and a main logic control unit, such as shown in FIG. 6, were used to assemble the present invention. The logic control unit has several connect slots. Slot number 7 is a positive connection and slot number 8 is a negative connection. Slots 9 and 10 carry information from the key pad. The power supply is connected to slots 2 and 3 of the logic control unit.

The zone 1 connection may be the front door monitoring of location on the logic control unit. A Linear receiver and transmitter set made by Isonic (Model WR200-28) were used for this feature. Slot number 6 of the logic control unit supplies the 12 volt positive to the receiver unit while slot number 11 supplies the negative to the unit. The receiver unit also connects to slot number 14 which is the common line. Slot number 15 in this embodiment is reserved for zone 1's connection. The transmitter may be powered by a 12 volt alkaline battery. A motion detector may be connected at zone 2 of the logic control unit. At points E1 and E2 a 12 volt DC 500 ma charge is supplied to keep the battery conditioned and allow the auxiliary power to be used in case of power failure. Power to the unit may be modified with the use of an altered charging board from a cellular phone. A Motorola intellacharger circuit board may be used to charge the battery. A set pot inside the charger allows setting up to 12.5 volts and further allows the charger to slow to a maintenance level charge once the battery reaches full charge.

Although preferred embodiments of the present invention have been described above, the present invention is susceptible to several variations and implementations which take advantage of the technology described herein and which would fall under the scope of coverage granted hereby. The description contained herein is not to be considered as limiting the scope of the invention, but is offered for an example of how the present invention may be implemented.

What is claimed is:

1. An alarm device, comprising:

a single portable enclosure, said enclosure including a handle to enable a person to carry said enclosure by hand;

a user interface control panel secured within said enclosure, wherein said interface control panel is accessible to a user of said alarm device;

a microprocessor board installed within said enclosure, said board in communication with said interface control panel;

a signal receiver installed within said enclosure, said receiver in communication with said microprocessor board, and wherein said receiver receives signals from at least one zone within a structure being monitored;

a communication circuit secured within said enclosure, and independent of any hard wired telephone lines connected to said structure, said communication circuit adapted to initiate a telephone call to a location apart from said structure;

an audio siren connected to said microprocessor board, wherein said siren is electrically connected to said microprocessor board so as to sound when a signal is received at said signal receiver indicating said zone of said structure has been breached; and a data interface electrically connected to said communication circuit and said microprocessor board for communicating a signal to said communication circuit from said microprocessor board to cause said communication circuit to initiate a telephone call.

2. The device of claim 1, further comprising a strobe light electrically connected to said microprocessor board, wherein said strobe light is electrically connected to said microprocessor so as to light when said signal is received at said signal receiver indicating said zone has been breached.

3. The device of claim 1, further comprising: a motion detector electrically connected to said microprocessor board.

4. The device of claim 1, wherein said interface control panel includes a programmable key pad.

\* \* \* \* \*

UNITED STATES PATENT AND TRADEMARK OFFICE
CERTIFICATE OF CORRECTION

PATENT NO. : 5,587,701

DATED : December 24, 1996

INVENTOR(S) : Brian K. Hess

It is certified that error appears in the above-indentified patent and that said Letters Patent is hereby corrected as shown below:

In column 4, line 43, please delete the number "31" and replace it with -- 37 --.

In column 5, line 5, please insert the number --33 -- after the word "battery".

Signed and Sealed this

Twenty-fifth Day of February, 1997

Attest:

BRUCE LEHMAN

*Attesting Officer*    *Commissioner of Patents and Trademarks*